United States Patent
Girdhar et al.

(10) Patent No.: US 10,785,213 B2
(45) Date of Patent: Sep. 22, 2020

(54) CONTINUOUS AUTHENTICATION

(71) Applicant: CA, Inc., New York, NY (US)

(72) Inventors: Dhiraj Girdhar, Westborough, MA (US); Dipto Chakravarty, Potomac, MD (US); Sandeep Kumar Ramnani, Shrewsbury, MA (US)

(73) Assignee: CA TECHNOLOGIES, INC., New York, NY (US)

( * ) Notice: Subject to any disclaimer, the term of this patent is extended or adjusted under 35 U.S.C. 154(b) by 273 days.

(21) Appl. No.: 15/937,513

(22) Filed: Mar. 27, 2018

(65) Prior Publication Data

US 2019/0306154 A1  Oct. 3, 2019

(51) Int. Cl.
*H04L 29/06* (2006.01)
*H04L 9/08* (2006.01)

(52) U.S. Cl.
CPC ........ *H04L 63/0838* (2013.01); *H04L 9/0819* (2013.01); *H04L 63/0846* (2013.01)

(58) Field of Classification Search
CPC combination set(s) only.
See application file for complete search history.

(56) References Cited

U.S. PATENT DOCUMENTS

| | | |
|---|---|---|
| 5,586,260 A | 12/1996 | Hu |
| 5,928,363 A | 7/1999 | Ruvolo |
| 6,088,805 A | 7/2000 | Davis et al. |
| 6,167,517 A | 12/2000 | Gilchrist et al. |
| 7,290,288 B2 | 10/2007 | Gregg et al. |
| 8,701,174 B1* | 4/2014 | Dotan ................... H04L 9/3228 709/203 |
| 2002/0165971 A1* | 11/2002 | Baron ................ H04L 63/0281 709/228 |
| 2003/0046589 A1* | 3/2003 | Gregg .................. G06F 21/335 726/5 |
| 2007/0199053 A1* | 8/2007 | Sandhu ................... G06F 21/31 726/4 |
| 2011/0078773 A1* | 3/2011 | Bhasin ............... H04L 63/0838 726/5 |
| 2015/0207792 A1* | 7/2015 | Chou .................. H04L 63/0869 726/17 |
| 2016/0285871 A1* | 9/2016 | Chathoth ............ H04L 63/0838 |
| 2018/0121921 A1* | 5/2018 | Woo ........................ H04W 4/80 |

* cited by examiner

*Primary Examiner* — Malcolm Cribbs
(74) *Attorney, Agent, or Firm* — Shook, Hardy & Bacon LLP

(57) ABSTRACT

Techniques are disclosed relating to authenticating a client computer system to a server computer system. In some embodiments, a client computer system sends, to a server computer system, authentication information for an initial access request for one or more resources. This information may include authentication credentials and attributes that collectively identify the client computer system. In some embodiments, the client computer system receives, from the server computer system, an authentication response that indicates an initial authentication of the client computer system. In some embodiments, the authentication response includes a cryptographic key. While the initial authentication is valid, in some embodiments, the client computer system repeatedly re-authenticates for subsequent access requests. Each of the subsequent access request may include a single-use password generated using a cryptographic key and the attributes of the client computer system.

16 Claims, 8 Drawing Sheets

CONTINUOUS AUTHENTICATION

BACKGROUND

Technical Field

This disclosure relates generally to computer systems and, more specifically, to the use of authentication for authenticating a client system to a server system.

Description of the Related Art

Client systems typically communicate with server systems to access information that is maintained by the server systems. For example, as users surf the Web, their web browser interacts with web servers to obtain website content and other information. To allow for this interaction to take place, a server system (e.g., a web server) supports an API via which a client system (e.g., web browser) makes calls to the server system for performing tasks on behalf of the user. In some cases, APIs may expose sensitive information such as bank account records, social security numbers, etc. As such, server systems often implement different mechanisms to help ensure that the API is not used to steal sensitive information.

SUMMARY

The present disclosure describes embodiments in which a client system is authenticated to a server system. In some embodiments, the client system sends authentication information to the server system for an initial access request for one or more resources available to the server system. The authentication information may include authentication credentials and attributes that collectively identify the client system. In some embodiments, the server system stores the attributes and verifies the authentication credentials. The server system, in some embodiments, sends an authentication response to the client system that indicates an initial authentication of the client system to the server system. The authentication response may include a cryptographic key. While the initial authentication is valid, in some embodiments, the client system repeatedly re-authenticates to the server system for subsequent access requests. These access requests may include a single-use password that is generated using the cryptographic key and the attributes of the client system. In some embodiments, the server system authenticates the client system in response to the received single-use password matching a single-use password generated by the server system.

Figure 1:
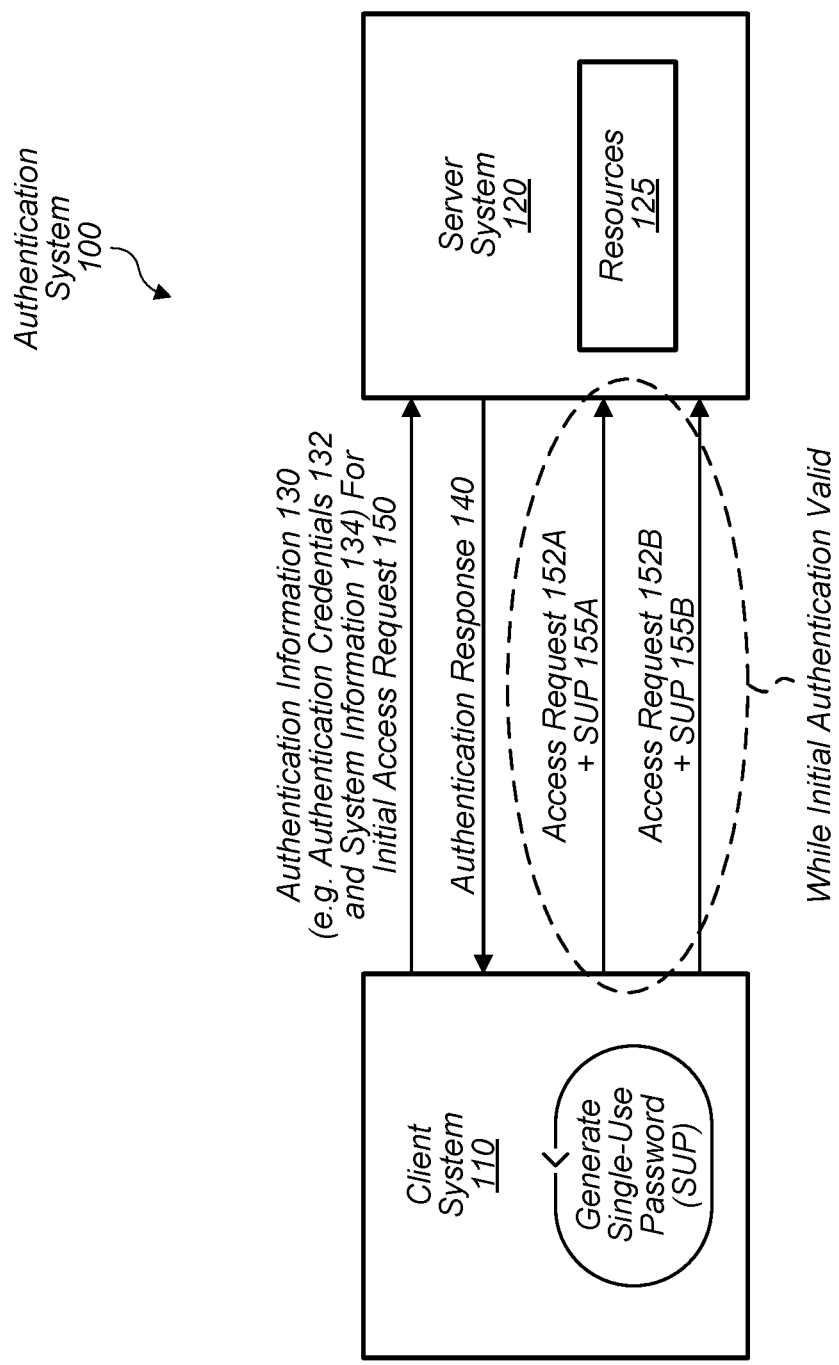
FIG. 1 is a block diagram illustrating example elements of an authentication system in which a client system authenticates to a server system, according to some embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to communicate over a network" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, in a single-use password that has multiple portions, the terms "first" portion and "second" portion can be used to refer to any portion of the single-use password. In other words, the first and second portions are not limited to the initial two portions of a single-use password.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

When a client system initially interacts with a server system to access information, that server system may authenticate the client system. For example, when a web browser initially interacts with a web server, that web server authenticates the web browser (on behalf of a user) for an interval of time. As part of the authentication, a server system may provide a cookie to the client system that allows the client system to make API calls without being authenticated—i.e. without re-authenticating the user of that browser. This cookie, however, is susceptible to being intercepted by a malicious party who may use the cookie to impersonate the valid user. Accordingly, it may be desirable to perform authentications for each access request (e.g., API call) sent during a session between a server system and a client system (acting on behalf of a user) to ensure that subsequent calls are coming from the same client system.

The present disclosure describes various techniques in which a client system (acting on behalf of a user) is authenticated for access requests issued during a session between the client system and a server system. In various embodiments that are described below, the client system performs an initial authentication with the server system and, while the initial authentication is valid (e.g., while the session exists between the client system and the server system), re-authenticates with the server system for each access request issued. In some embodiments, the client system provides, for an initial access request for resources, authentication information that is usable by the server system to perform an initial authentication of the client system. This authentication information may include authentication credentials (e.g., a username and password) and attributes that collectively identify the client system. After authenticating the client system, in some embodiments, the server system sends an authentication response that indicates an initial authentication of the client computer system. This response may include a cryptographic key that is used to generate single-use passwords (SUPs). As used herein, the term "single-use password" can be used interchangeably with the term "one-time password." In some embodiments, the cryptographic key in conjunction with the attributes serve as a shared secret between the client system and the server system that can be used to generate SUPs. Accordingly, when sending an access request while the initial authentication is valid, the client system may generate an SUP using the shared secret and provide that SUP to the server system. The server system may then verify the SUP by comparing the client-side SUP to an SUP generated by the server system using the shared secret. In this manner, the server system may re-authenticate the client system for each access request issued during a session between the client system and the server system.

These techniques may be advantageous over prior approaches as these techniques allow for a session between a client system and a server system to be protected from being attacked by a malicious client system. In particular, a malicious client system does not include the same system attributes as a valid client system and thus cannot generate the appropriate SUP that is expected by the server system from the valid client system. A system for implementing these techniques will now be discussed below, starting with FIG. 1.

Turning now to FIG. 1, a block diagram of an authentication system is shown. In the illustrated embodiment, authentication system 100 includes a client system 110 and a server system 120. Also, as shown, server system 120 includes resources 125. In some embodiments, system 100 is implemented differently than shown—e.g., server system 120 may be divided into an authentication server system that handles the authentication of client system 110 and a resource management server system that handles the storing and providing of resources 125 to client system 110.

Authentication system 100, in various embodiments, is implemented by client system 110 and server system 120 to authenticate client system 110 (that is, in some cases, authenticate the user who is using client system 110) for an initial access request 150 to server system 120 and then to re-authenticate client system 110 for each subsequent access request 152 sent to server system 120 while the authentication of the initial access request 150 is still valid. When authenticating client system 110, server system 120 attempts to verify that client system 110 is the entity that it claims to be (or to be acting on behalf of). For example, when client system 110 is requesting access to a certain user's account, server system 120 may authenticate client system 110 by determining that client system 110 has been given authority by that certain user to access their account. Once authenticated, client system 110 may perform certain tasks that are granted under that authentication. Client system 110 and server system 120 may perform different portions of authentication system 100 over time. As an example, after being initially authenticated by server system 120, client system 110 may not send access requests 152 for an extended period of time (e.g., several hours). In some embodiments, the authentication approach implemented by authentication system 100 is initiated in response to a user causing client system 110 to retrieve a resource 125 from a server system 120—e.g., the user wishes to access their account records.

Client system 110, in various embodiments, is hardware or a combination of software routines and hardware that enables access to resources 125 that are maintained by server system 120. For example, client system 110 may be a desktop computer system running a web browser that enables a user to access their information (e.g., bank records) through webpages, a mobile phone application, or an application running on an Internet of Things (IoT) device that retrieves data without direct instruction from a user (e.g., a periodic job that pulls stock market data). In various cases, resources 125 may include sensitive/confidential information and thus it may be desirable to protect this information by authenticating the requestor.

Thus, in some embodiments, client system 110 provides authentication information 130 to server system 120 for initial access request 150, which is distinct from subsequent access requests 152 also depicted in FIG. 1. In some embodiments, initial access request 150 serves to establish a session between systems 110 and 120 (which involves an initial authentication of system 110). This may be in addition to requesting one or more resources 125. Access requests 152 are requests for resources 125 that are sent while the initial authentication is valid (e.g., the session established by initial access request 150 is valid). For example, initial access request 150 may be used to log a user into a service provided by server system 120 and access requests 152 may be used to access various parts of the service while the user is logged in.

In some embodiments, authentication information 130 is included in an initial access request 150; in other embodiments, it is provided as a response to a request from server system 120 that follows initial access request 150 (e.g., client system 110 requests resources 125 and then server system 120 responds by requesting information usable to authenticate client system 110). Accordingly, in various embodiments, authentication information 130 is usable by server system 120 to authenticate client system 110 (on behalf of a user of that system 110). In some embodiments, information 130 specifies authentication credentials 132 and system information 134. Authentication credentials 132 may be, for example, a username and password provided by a user, or a client identification (ID) and a client secret, which are used in an authentication protocol such as OAUTH Client Credentials Grant. In some embodiments, system information 134 specifies one or more attributes of client system 110 that, as a collective, identify client system 110 (i.e., provide an identifier for client system 110). In many instances, the values of this collection of attributes is sufficient to uniquely identify client system 110 from other client systems. It is possible in rare cases, however, for two systems to have the same attributes; in such cases, the collection of attributes would not uniquely identify either client system 110. In various embodiments, server system 120 generates an authentication response based on authentication information 130.

Server system 120, in various embodiments, is hardware or a combination of software routines and hardware that facilitates the authentication of client system 110 and the accessing of resources 125 in response to a valid authentication. Server system 120 may include different components—e.g., an authentication server and a resource server. Server system 120, in some embodiments, maintains resources 125; in other embodiments, resources 125 are maintained by an external system, but are still accessible to server system 120. Resources 125 may include data (such as documents, pictures, videos, etc.) and system resources (such as storage capacity, processing capacity, etc.). As such, access requests 150 and 152 may be used to cause server system 120 to return data or to perform particular tasks such as updating a record in a database or notifying a user. Server system 120 may return data or perform particular tasks after client system 110 has been authenticated.

In various embodiments, in response to receiving authentication information 130 from client system 110, server system 120 may attempt to verify authentication credentials 132. If credentials 132 are invalid, then server system 120 may provide an authentication response 140 indicating that credentials 132 are invalid and access to resources 125 is not granted. If credentials 132 are valid, then, in various embodiments, server system 120 provides a response 140 that is indicative of an initial authentication of client system 110. This response 140 may include a session ID, an authentication token, a cryptographic key, a system identifier, and/or the one or more requested resources 125. These various items are discussed in greater detail below with respect to FIGS. 2 and 3.

While the initial authentication is valid, client system 110 may issue one or more access requests 152 to access resources 125. For each access request 152, server system 120 may re-authenticate client system 110 to ensure that a malicious client system is not impersonating the user of system 110. Accordingly, in various embodiments, client system 110 provides a single-use password (SUP) 155 with each access request 152 that it sends to server system 120. As shown, for example, client system 110 sends two access requests 152: an access request 152A with an SUP 155A, and another, different access request 152B with a different SUP 155B. In various embodiments, client system 110 generates an SUP 155 based on the cryptographic key (included in authentication response 140) and system information 134. An example manner in which the cryptographic key and system information 134 are used is discussed in greater detail below with respect to FIG. 2. In various embodiments, access requests 152 include additional information such as an authentication token and/or a session ID (which may cause system 120 to expect an SUP 155). After receiving access request 152A, for example, server system 120 may compare SUP 155A with an expected SUP 155 that is generated server-side (i.e. generated by server system 120). If client system 110 cannot be authenticated (e.g., SUP 155A is not valid), then server system 120 may invalidate the session between it and the valid client system 110; however, if client system 110 can be authenticated, then server system 120 may provide the requested resources 125.

In an example implementation of authentication system 100, a user of a client system 110 accesses a banking service provided by a server system 120. The user, wishing to access their account, causes client system 110 to provide, for an initial access request 150, a username and password along with attributes that collectively identify client system 110. In the example implementation, server system 120 verifies the username and password, and returns a session ID and cryptographic key along with a home webpage providing information about the user's account. Wishing to access specific banking records while the user is logged in, the user causes client system 110 to send an access request 152 that specifies the session ID and an SUP 155 (that is generated client-side). Server system 120 then verifies the provided SUP 155 and if it is valid, returns the requested banking records for the user to view.

Implementing authentication system 100 in this manner may be advantageous over prior approaches as it allows for a client system to be re-authenticated during the duration of a valid session between the client system and a server system. This may prevent malicious actors from stealing user information by using valid session information to impersonate a user. Also, the generation of SUPs based on system attributes may hinder malicious actors as they do not have the same system attributes as the client system that established the valid session with the server system. An example of client system 110 will now be discussed.

Figure 2:
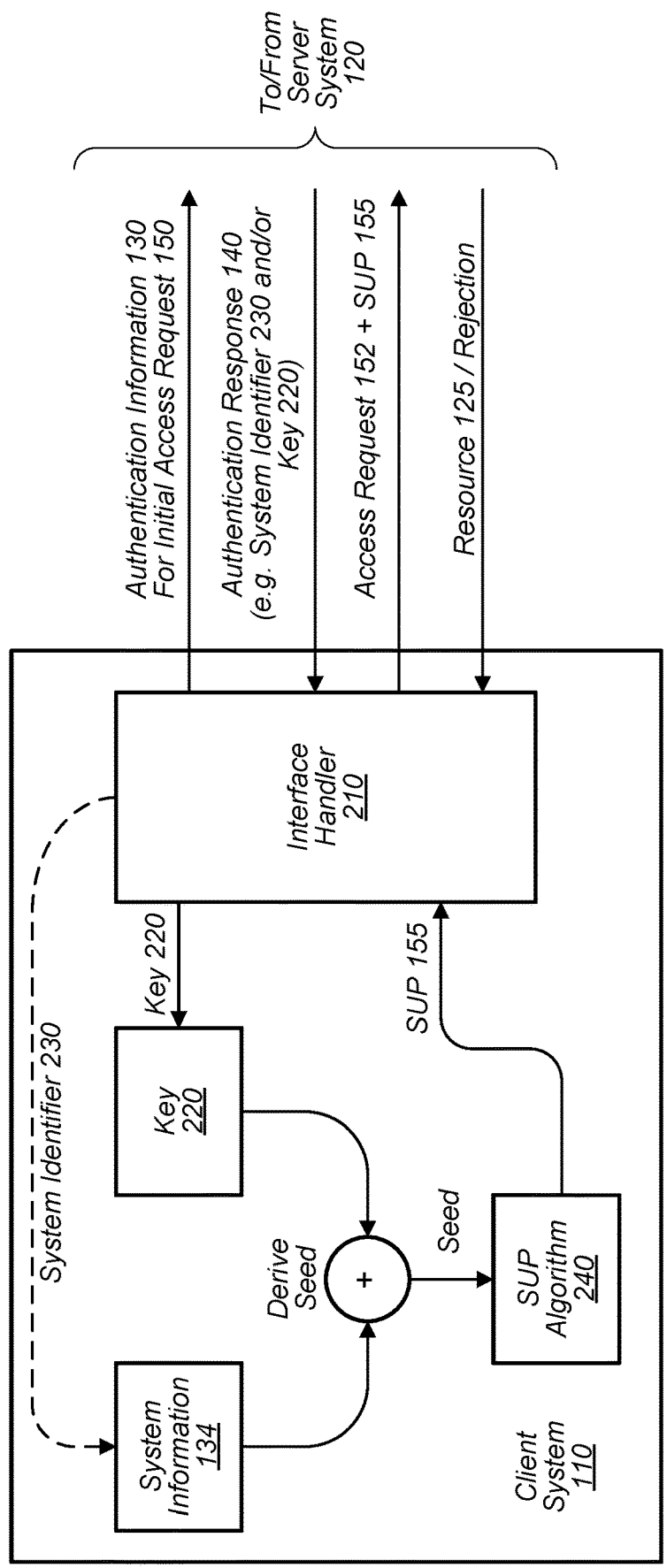
FIG. 2 is a block diagram illustrating example elements of a client system that performs a portion of an authentication approach, according to some embodiments.

Turning now to FIG. 2, a block diagram of client system 110 is shown. In the illustrated embodiment, client system 110 includes system information 134, an interface handler 210, a key 220, a system identifier 230, and an SUP algorithm 240. While not shown, client system 110 may also include authentication credentials 132. In some embodiments, client system 110 may be implemented differently than shown—e.g., system information 134 and key 220 may not be combined before being used as an input into SUP algorithm 240.

Interface handler 210, in various embodiments, is a set of software routines executable to facilitate communication with server system 120, including the issuing of requests 150 and 152 to access resources 125. As a part of authentication system 100, handler 210 may provide authentication information 130 to server system 120 and receive, in response, an authentication response 140. This response 140 may include key 220 and system identifier 230. This system identifier 230, in some embodiments, is used in place of system information 134 for generating SUPs.

System information 134, in various embodiments, specifies one or more attributes that, as a collective, uniquely identify client system 110. In some embodiments, these attributes are stored as a single String value. The attributes may include, but are not limited to, the operating system (OS) running on client system 110, the manufacture of client system 110, the model of client system 110, the serial numbers of the hardware components that are in client system 110, the web browser running on client system 110, the fonts installed on client system 110, the screen resolution of client system 110, the time zone in which client system 110 resides, the processor bus speed of client system 110, the name of client system 110, whether a debugger is running on client system 110, and whether client system 110 is jail broken. The attributes, however, may change while the initial authentication is valid—e.g., the OS is updated. Thus, in some embodiments, server system 120 generates and sends system identifier 230 to client system 110 to serve as a more permanent marker of client system 110. System identifier 230 may be, for example, a String value that uniquely identifies client system 110.

Key 220, in various embodiments, is a cryptographic key generated by a server system 120 for use in generating SUPS. Key 220 may be generated using a random number generator or a pseudorandom number generator. In some instances, key 220 may be generated based on information having a random component such as mouse movements of users instructed to sporadically move their mouse. In other instances, key 220 may be generated using a key derivation function such as a cryptographic hash function (e.g., an algorithm in the secure hash algorithms family). In some embodiments, key 220 is stored by interface handler 210 in a database of client system 110 or in a secure element.

System information 134 (or identifier 230) and key 220, in various embodiments, serve as a seed input into SUP algorithm 240. As mentioned above, system information 134 and key 220 may each be a String value. Accordingly, in some embodiments, system information 134 and key 220 are concatenated and then fed into a password-based key derivation function (e.g., Password-Based Key Derivation Function 2 (PBKDF2)) to derive a seed value. The seed value may then be used as an input to SUP algorithm 240 as shown. The seed value, however, may be generated based on other values such as a time value.

When wishing to send an access request 152, in various embodiments, interface handler 210 uses SUP algorithm 240 to generate an SUP 155. SUP algorithm 240 may be, for example, a keyed-hash message authentication code (HMAC) based single-use password algorithm that receives a seed input based on system information 134 and key 220 (or in some cases, system identifier 230 and key 220). In some embodiments, the generated SUP 155 is valid for a single access request 152 and thus a new SUP 155 is generated for each request 152. After obtaining an SUP 155, interface handler 210 may send access request 152 along with the generated SUP 155 to server system 120. If the SUP is valid, then interface handler 210 may be granted access to resources 125; otherwise handler 210 may receive a rejection notification.

Thus, by generating and providing SUPs 155 for each access request 152, client system 110 may be authenticated to server system 120. An example of sever system 120 will now be discussed.

Figure 3:
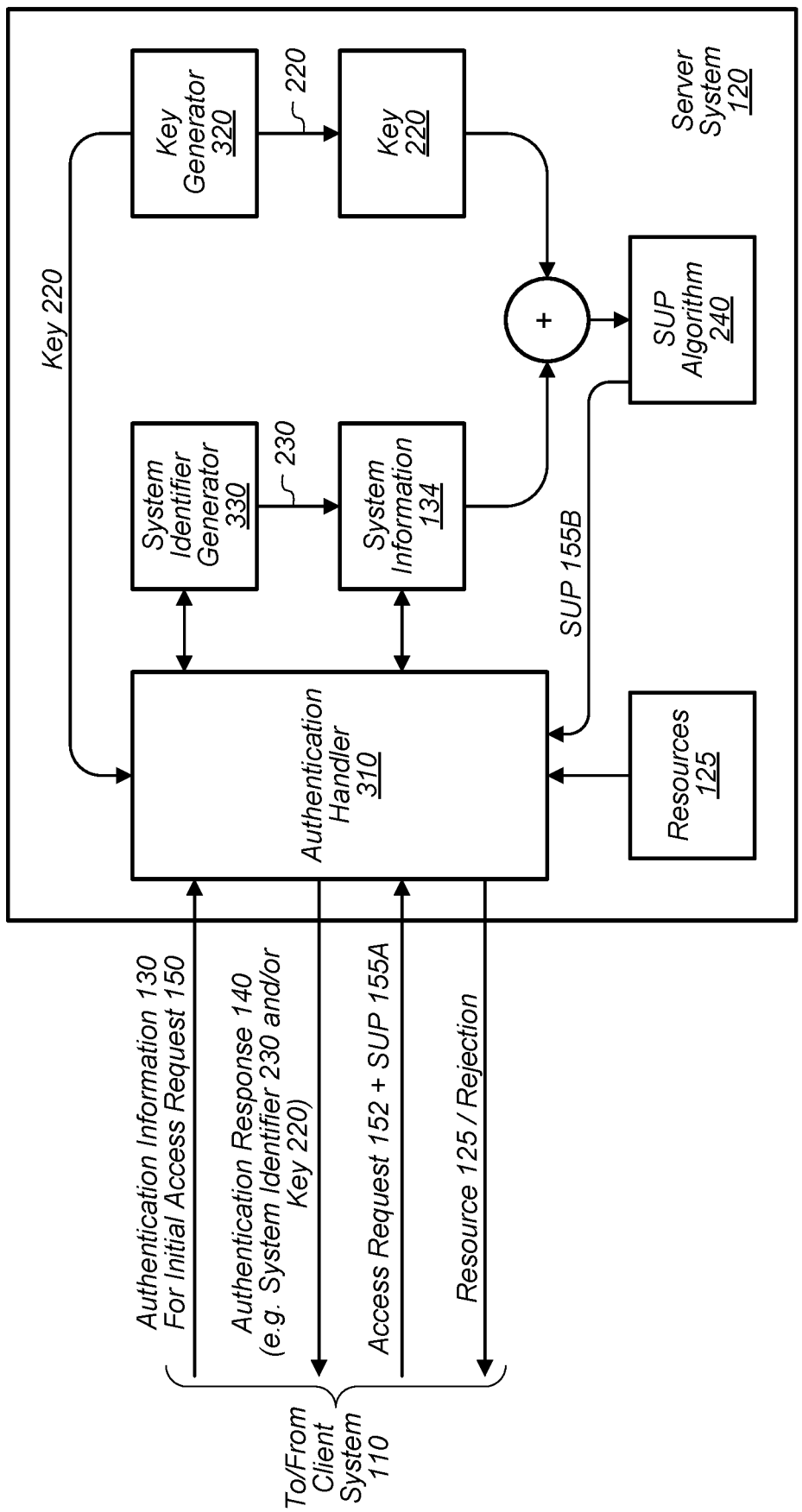
FIG. 3 is a block diagram illustrating example elements of a server system that performs a portion of an authentication approach, according to some embodiments.

Turning now to FIG. 3, a block diagram of server system 120 is shown. In the illustrated embodiment, server system 120 includes resources 125, SUP algorithm 240, an authentication handler 310, a key generator 320, and a system identifier generator 330. While not shown, in various embodiments, server system 120 stores valid authentication credentials 132. In some embodiments, server system 120 may be implemented differently than shown—e.g., server system 120 may be divided into an authentication server and a resource manager server that interact with each other.

Authentication handler 310, in various embodiments, is a set of software routines that are executable to facilitate communication with client system 110, including the authentication of client system 110 for accessing resources 125. As a part of authentication system 100, in various embodiments, server system 120 receives authentication information 130 from a client system 110 for an initial access request 150.

As mentioned earlier, authentication credentials 132 may be a username and password provided by a user of client system 110. Accordingly, in various embodiments, authentication handler 310 verifies whether the provided authentication credentials 132 are valid. This may, in some cases, involve comparing the provided credentials 132 with valid credentials 132 that were previously provided to server system 120. For example, a user may define their username and password when they setup an account. Accordingly, when someone attempts to log into that account, server system 120 may compare the username and password that they provide in initial access request 150 against the username and password specified when the account was setup. In some embodiments, valid passwords are hashed and stored at server system 120. As such, when comparing two passwords (e.g., a password provided in authentication information 130 and a stored-valid password), server system 120 may hash both of them and then compare them in a hashed state. In response to a match, server system 120 may provide authentication response 140 to client system 110, indicating an initial authentication of client system 110 with server system 120.

As mentioned earlier, authentication response 140 may include a session identifier (ID), an authentication token, key 220, system identifier 230, and/or resources 125. A session ID, in various embodiments, is a unique value that identifies a session between client system 110 (on behalf of a user—that is, the session ID may be granted to the user) and server system 120. In some embodiments, a session ID is a random number generated by server system 120 and then provided to client system 110. The session identified by a session ID may last for a particular duration of time (e.g., a day, a year, etc.) or until a particular event occurs (e.g., a user logs out of their account). When server system 120 receives a session ID (which may be included in a subsequent access request 152), it may use the session ID to lookup information about the state of the communications between it and client system 110—e.g., how many items a user has put into their checkout cart. In some cases, it may be desirable to not maintain session information at server system 120 and thus an authentication token may be used. An authentication token, in various embodiments, specifies identification data, authorization claims, an expiration time, and/or other custom data. Client system 110 may provide an authentication token in place of (or with) a session ID when issuing an access request 152.

A session ID (or an authentication token), in various embodiments, represents an initial authentication of client system 110 (e.g. an authentication of the user who is using system 110) with server system 120. Accordingly, this initial authentication may become invalid when the session ID (or authentication token) becomes invalid. For example, the session identified by a session ID may expire, causing the initial authentication to become invalid. In some cases, the initial authentication may become invalid after a particular number of access requests 152 have been sent by a client system 110. In other cases, the initial authentication may become invalid in response to an invalid access request 150 or 152 sent by a malicious client system 110. For example, if a malicious client system 110 fails to provide a valid SUP 155, then server system 120 may invalid the session between it and the authentic client system 110.

Key 220, in various embodiments, is generated by key generator 320. In some cases, key generator 320 may be a random or pseudorandom number generator; in other cases, it may be a key derivation function (e.g., PBKDF2). System identifier 230, in various embodiments, is generated by system identifier generator 330. System identifier generator 330 may be a key derivation function that takes in attributes of client system 110 (which are specified in system information 134) as an input. In some embodiments, system identifier generator 330 generates a random number and then encrypts it along with additional data such as version information and a time stamp. This encrypted data may be system identifier 230 or, in some cases, system identifier 230 is a value that maps to this encrypted data. In various embodiments, the encrypted data is encrypted using cryptographic keys stored at server system 120 so that only server system 120 can decrypt the encrypted data.

After sending response 140 (and in some cases, while the initial authentication is valid), server system 120 may receive an access request 152 that includes an SUP 155A. In response to receiving the request 152, server system 120 may attempt to authenticate client system 110 based on the received SUP 155A. Accordingly, in some embodiments, server system 120 uses system information 134 (or in some instances, system identifier 230) and key 220 to produce a seed (e.g., by performing a key derivation function using a concatenation of information 134 and key 220 as discussed with respect to client system 110) that is fed into SUP algorithm 240 for producing an SUP 155B. In various embodiments, if client system 110 is authenticate and thus not a malicious client system 110, then the manner in which SUP 155A and 155B are both generated is the same—that is, the same input is fed into the same SUP algorithm. Subsequent to SUP 155B being generated, authentication handler 310 may compare SUP 155A and 155B to determine whether they match. If they match, then client system 110 is authenticated with server system 120 and then granted access to the requested resources 125. If they do not match, then server system 120 may send a rejection notification to client system 110 indicating that the request 152 has been rejected.

Figure 4:
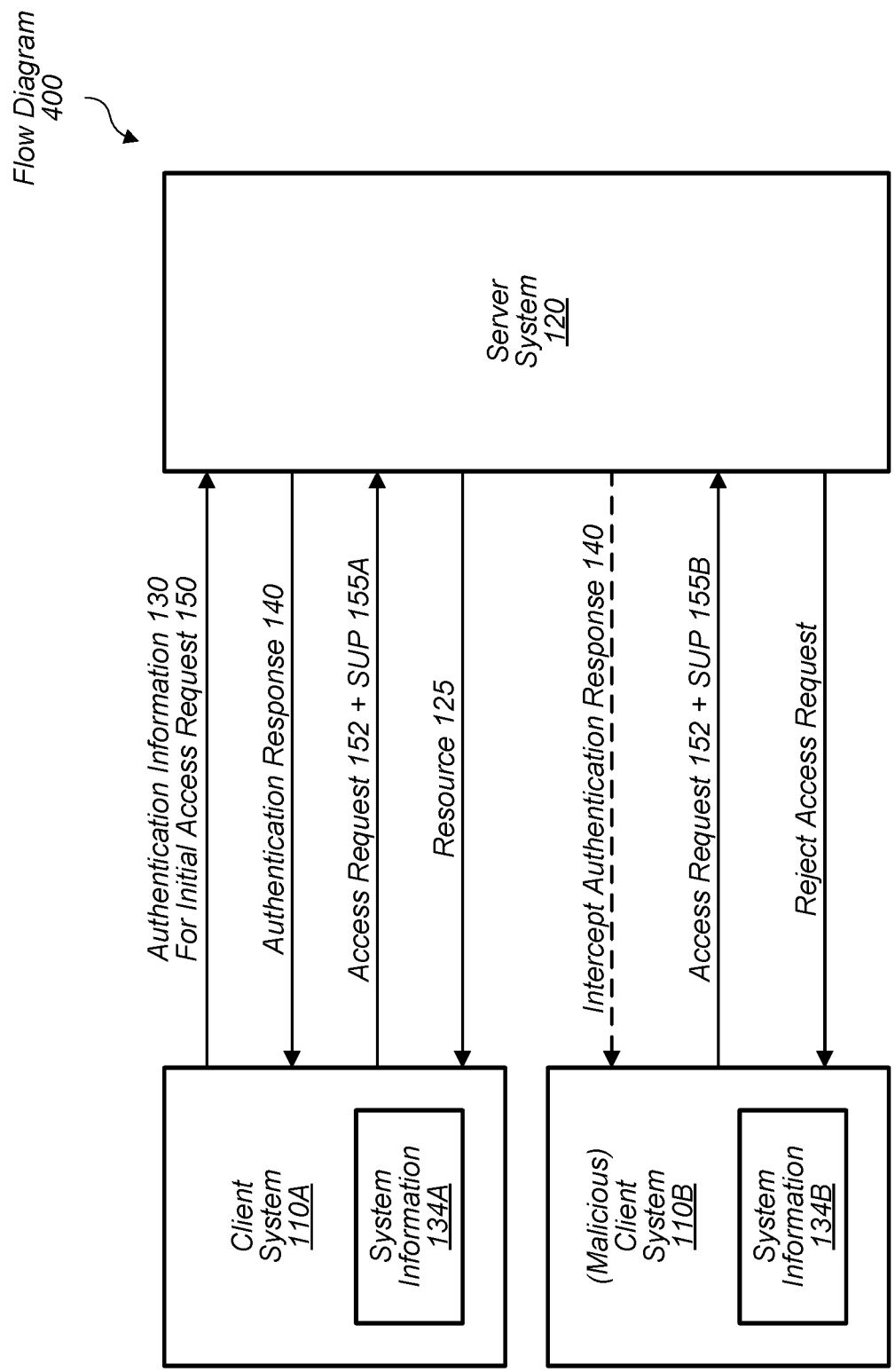
FIG. 4 is a flow diagram illustrating example elements of an interaction involving a malicious client system and a server system, according to some embodiments.

Turning now to FIG. 4, a block diagram of an example flow diagram 400 is shown. In the illustrated embodiment, flow diagram 400 involves a client system 110A, a client system 110B, and a server system 120. As further shown, client system 110A includes system information 134A and client system 110B includes different system information 134B.

In various embodiments, flow diagram 400 begins with client system 110A providing, on behalf of a user, authentication information 130 to server system 120 for an access request 150 (not shown). This authentication information 130 may include system information 134A. In response to authenticating client system 110A (e.g., authenticating based on credentials 132), server system 120 provides an authentication response 140 to client system 110A. As shown, however, this response 140 (and its contents—e.g., session ID) is intercepted by client system 110B (which is a malicious actor). Client system 110B may, for example, intercept response 140 by acting as a man-in-the-middle between systems 110A and 120, or by obtaining it from client system 110A. After receiving response 140, client system 110A generates SUP 155A based on its system information 134A and then sends an access request 152 with the generated SUP 155A to server system 120 for access to a resource 125. Server system 120 then generates a server-side SUP 155 based on system information 134A and authenticates client system 110A based on the server-side SUP 155 matching SUP 155A. In response to authenticating client system 110A, server system 120 provides the requested resource 125 to client system 110A as shown.

After intercepting authentication response 140, malicious client system 110B generates SUP 155B based on its system information 134B and then sends an access request 152 with the generated SUP 155B to server system 120 for access to a resource 125. Server system 120 then generates a server-side SUP 155 based on system information 134A and compares it to SUP 155B. Since the server-side SUP 155 and SUP 155B were generated based on different system information 134, they do not match and thus server system 120 determines that malicious client system 110B is not authentic. In response to this determination, server system 120 provides a rejection response to malicious client system 110B. In various embodiments, server system 120 invalidates the session between it and client system 110A, requiring client system 110A to provide authentication information 130 again. By authenticating client system 110 for each access request 150 and 152 and generating SUPs 155 based on system information 134, server system 120 may prevent a malicious actor from harming resources 125.

Figure 5:
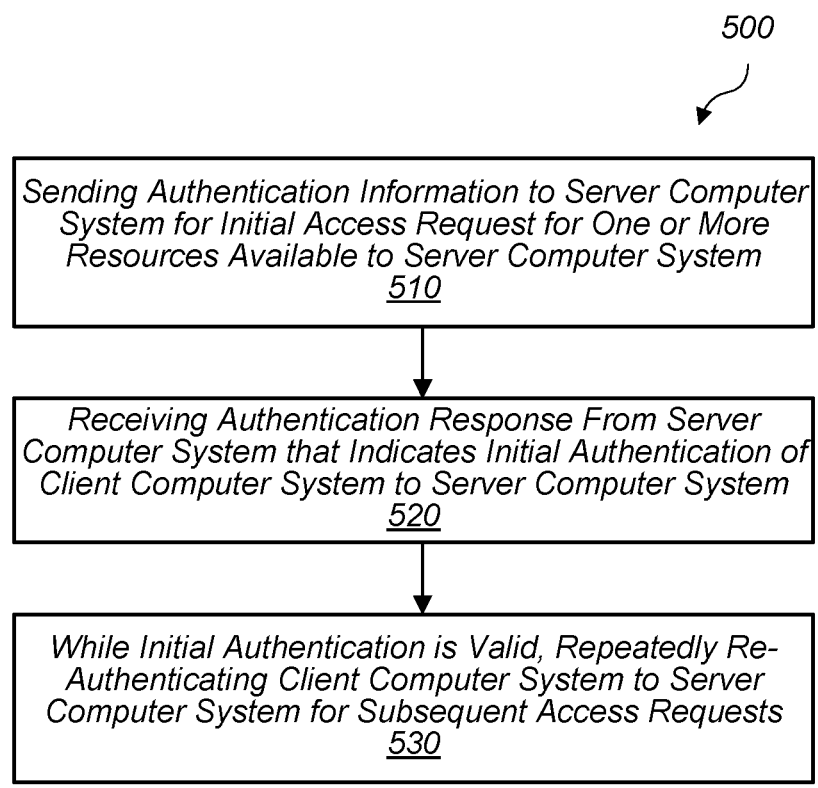
FIG. 5-7 are flow diagrams illustrating example methods relating to the authenticating of a client system with a server system, according to some embodiments.

Turning now to FIG. 5, a flow diagram of a method 500 is shown. Method 500 is one embodiment of a method performed by a client computer system such as client system 110 to initially authenticate with a server computer system (e.g., system 120) and then re-authenticate with the server system for each access request (e.g., access request 152) issued while the initial authentication is valid. Method 500 may be performed on behalf of a user and in response to a user logging into a website and then visiting different webpages of that website. In some embodiments, method 500 may include additional steps such as the client computer system issuing the initial access request (e.g., request 150) to receive a request for authentication information (e.g., authentication information 130).

Method 500 begins in step 510 with the client computer system sending authentication information (e.g., information 130) to a server computer system for an initial access request for one or more resources (e.g., resources 125) available to the server computer system. The authentication information may include authentication credentials (e.g., credentials 132) and attributes (e.g., information 134) that collectively identify the client computer system.

In step 520, the client computer system receives, from the server computer system, an authentication response (e.g., response 140) that indicates an initial authentication of the client computer system to the server computer system. This authentication response may include a cryptographic key (e.g., key 220). In some embodiments, the authentication response includes a session identifier (ID) that corresponds to a session between the client computer system and the server computer system. The initial authentication may be valid for the duration of the session such that the expiration of the session results in the initial authentication becoming invalid. Subsequent to the session expiring, in some embodiments, the client computer system resends the authentication information to the server computer system to re-authenticate (e.g., to establish another session) the client computer system. In some embodiments, the received authentication response includes a device identifier (e.g., system identifier 230) that is usable for generating single-use passwords using the cryptographic key and the device identifier.

In step 530, while the initial authentication is valid (e.g., while the session between the client computer system and the server computer system is valid), the client computer system repeatedly re-authenticates to the server computer system for subsequent access requests. Each of the subsequent access requests may include a single-use password (e.g., SUP 155) that is generated, for a given subsequent access request, using the cryptographic key and the attributes of the client computer system. Generating a single-use password of a given subsequent access request, in some embodiments, includes performing a single-use password derivation function (e.g., algorithm 240) using a seed that includes the cryptographic key and the attributes of the client computer system. In some embodiments, each of the subsequent access requests includes the session ID from the authentication response in addition to the single-use password that is generated for that subsequent access request. In response to the client computer system sending an access request including a single-user password after the initial authentication has become invalid, in some embodiments, the client computer system receives an authentication request to provide authentication credentials and attributes of the client computer system, to the server computer system, for re-authentication of the client computer system to the server computer system.

Figure 6:
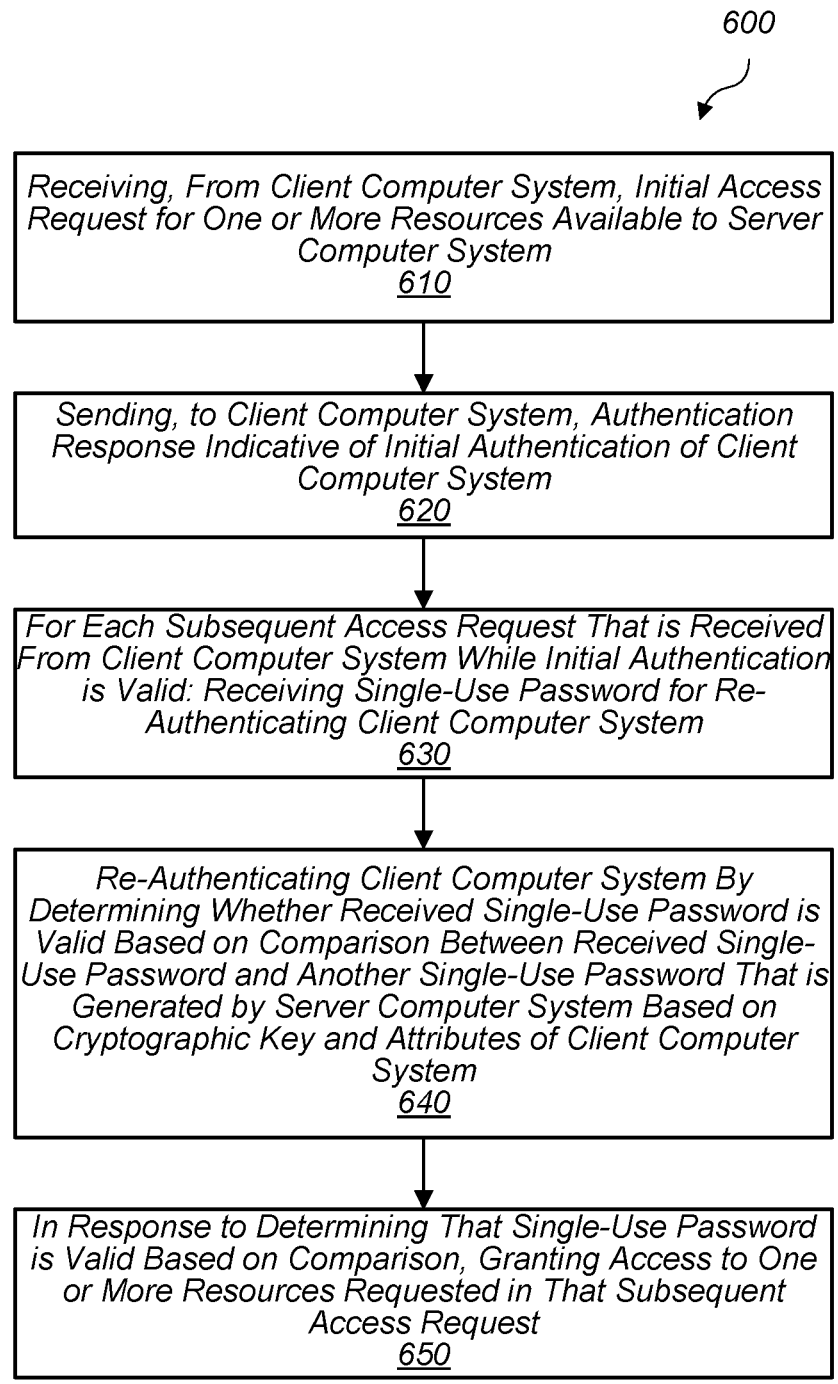

Turning now to FIG. 6, a flow diagram of a method 600 is shown. Method 600 is one embodiment of a method performed by a server computer system such as server system 120 to initially authenticate a client computer system (e.g., system 110) and then re-authenticate that client computer system for each API call (e.g., access request 152) that is made while the initial authentication is valid. Method 600 may be performed in response to the client computer system attempting to gain access to one or more resource (e.g., resources 125) maintained by the server computer system. In some embodiments, method 600 includes additional steps. For example, the server computer system generating a device identifier (e.g., system identifier 230) based on attributes (e.g., information 134) of the client computer system.

Method 600 begins in step 610 with the server computer system receiving, from a client computer system, an initial access request (e.g., initial access request 150) for one or more resources (e.g., resources 125) that are available to the server computer system. This access request may include authentication information (e.g., information 130) that identifies authentication credentials (e.g., credentials 132) and attributes (e.g., system information 134) that collectively identify the client computer system.

In step 620, the server computer system sends an authentication response to the client computer system that is indicative of an initial authentication of the client computer system by the server computer system. The authentication response may specify a cryptographic key (e.g., key 220) that is usable to generate single-use passwords. In some embodiments, the initial authentication is valid for a pre-defined number of access requests (e.g., twenty requests). In some embodiments, the server computer system generates, based on the attributes of the client computer system, a device identifier. This identifier may be included in the authentication response and may be usable by the client computer system and the server computer system to generate single-use passwords for authenticating the client computer system in subsequent access requests that are received while the initial authentication is valid. In various embodiments, the server computer system generates a session identifier (ID) identifying a session between the client computer system and the server computer system and sends that session ID in the authentication response to the client computer system. In some embodiments, the expiration of the session may result in the initial authentication becoming invalid.

In step 630, for each subsequent access request that is received from the client computer system while the initial authentication is valid: the server computer system receives a single-use password for re-authenticating the client computer system. In some embodiments, in response to receiving an access request that includes a single-use password after the initial authentication has become invalid, the server computer system sends a request for authentication credentials and attributes of the client computer system for re-authenticating the client computer system (e.g., for establishing a new session between the two systems). In some embodiments, for each subsequent access request, the server computer system receives a session ID in addition to the single-use password.

In step 640, the server computer system re-authenticates the client computer system by determining whether the single-use password is valid based on a first comparison between the single-use password and another single-use password that is generated by the server computer system based on the cryptographic key and the attributes of the client computer system.

In step 650, in response to determining that the single-use password is valid based on the first comparison, the server computer system grants the client computer system access to one or more resources requested in the subsequent access request.

In some embodiments, while the initial authentication is still valid, the server computer system receives an access request from a different client computer system (e.g., client system 110B—a malicious client system) for one or more resources associated with a user of the client computer system. The access request may specify a single-use password that is generated using the cryptographic key and attributes (e.g., system information 134B) that collectively identify the different client computer system. In such embodiments, the server computer system may determine whether the single-use password is valid based on a second comparison between that single-use password and another single-use password generated by the server computer system using the cryptographic key and the attributes that collectively identify the non-malicious client computer system (i.e., the client computer system that sent the initial access request). In some embodiments, in response to determining that the single-use password from the different client computer system is invalid based on the second comparison, the server computer system rejects the access request from the different client computer system.

Figure 7:
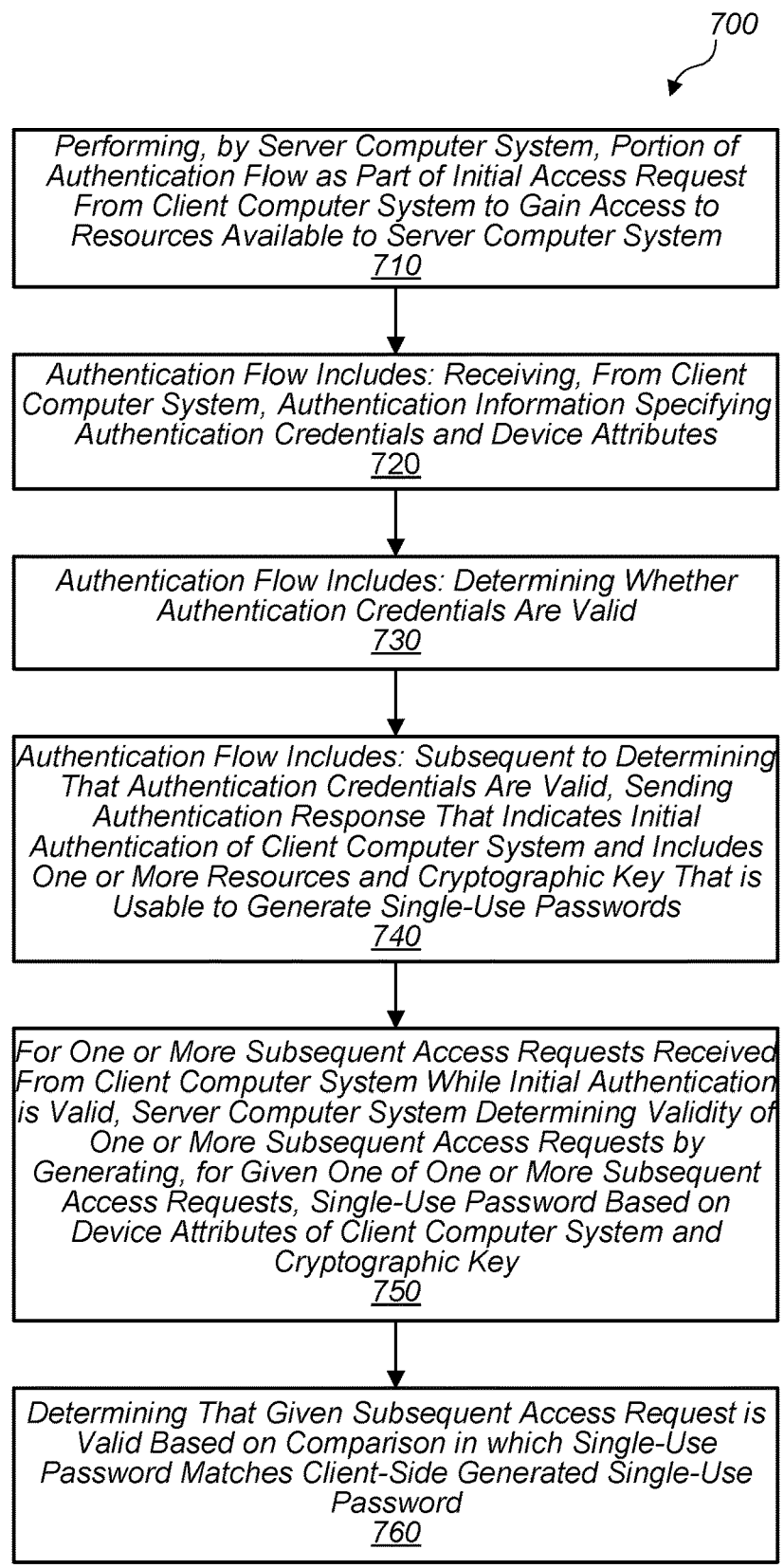

Turning now to FIG. 7, a flow diagram of a method 700 is shown. Method 700 is one embodiment of a method performed by a server computer system such as server system 120 to continually authenticate a client computer system (e.g., client system 110) for access requests received from that client computer system. Method 700 may be performed in the context of a large business enterprise that includes both the server computer system and the client computer system—e.g., an employee of a business accessing resources from a server of the business. In some embodiments, method 700 may include additional step such as a server computer system rejecting access requests from a malicious client computer system.

Method 700 begins in step 710 with a server computer system performing a portion of an initial authentication flow as part of an initial access request (e.g., request 150) from a client computer system to gain access to resources available to the server computer system. Performing the portion of the initial authentication flow includes steps 720, 730, and 740. In various embodiments, the client computer system performs a different portion of the initial authentication flow as part of the initial access request. The client computer system may send authentication information that specifies authentication credentials and device attributes of the client computer system. The device attributes may include: an internet protocol (IP) address of the client computer system, an operating system running on the client computer system, a location of the client computer system, and a model number of the client computer system. The resources may include one or more database records that are stored in associated with a user of the client computer system.

In step 720, the server computer system receives authentication information from the client computer system that specifies authentication credentials (e.g., authentication credentials 132) and device attributes (e.g., system information 134). In various embodiments, the device attributes collectively identify the client computer system—that is, as a collective the attributes uniquely identify the client computer system. The authentication information may be received for an initial access request that is a login request issued through an application programming interface (API) supported by the server computer system.

In step 730, the server computer system determines if the authentication credentials are valid. The authentication credentials may include a username and password from a user of the client computer system. Accordingly, in some embodiments, determining if the authentication credentials are valid includes comparing a hashed version of the password that is included in the authentication credentials with a hashed version of a valid password (i.e., a password that has been previously provided and is known to be authentic) stored in a database accessible to the server computer system. The server computer system may determine that the authentication credentials are valid based on the comparing indicating that the hashed version of the password matches the hashed version of the valid password.

In step 740, subsequent to determining that the authentication credentials are valid, the server computer system sends an authentication response (e.g., response 140) that indicates an initial authentication of the client computer system and includes one or more resources and a cryptographic key (e.g., key 220) usable to generate single-use passwords (e.g., SUPs 155)

In step 750, for one or more subsequent access requests (e.g., access requests 152) that are received from the client computer system while the initial authentication is currently valid, the server computer system determines a validity of the one or more subsequent access requests by generating, for a given subsequent access request, a single-use password based on the received device attributes that identify the client computer system and the cryptographic key. The given subsequent access request may specify a client-side generated single-use password.

In step 760, the server computer system determines that the subsequent access request is valid based on a comparison in which the (server's) single-use password matches the client-side generated single-use password.

Exemplary Computer System

Figure 8:
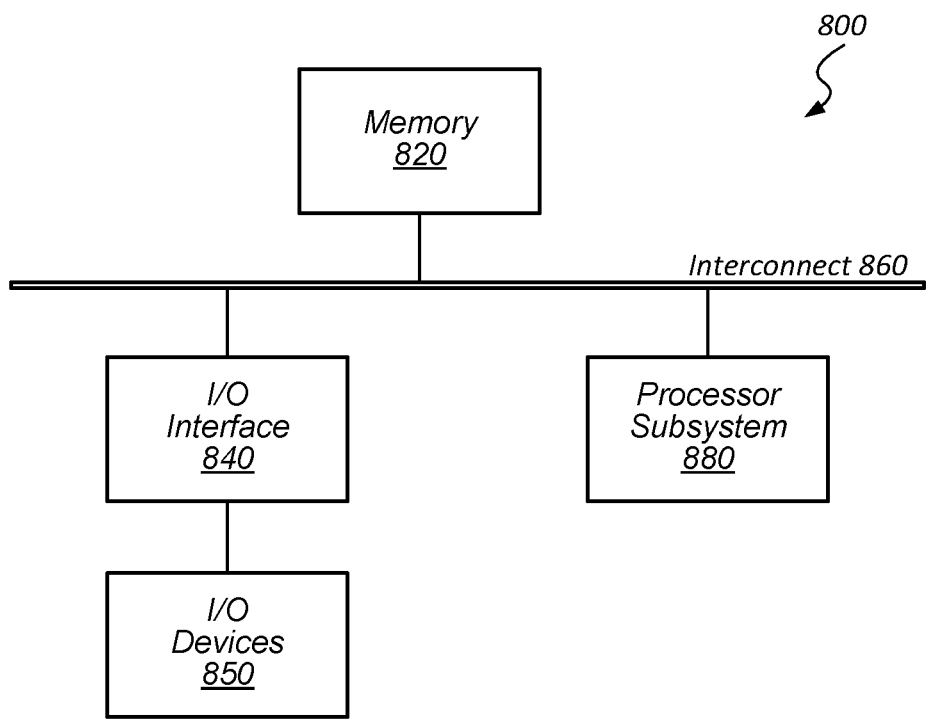
FIG. 8 is a block diagram illustrating an example computer system, according to some embodiments.

Turning now to FIG. 8, a block diagram of an exemplary computer system 800, which may implement client system 110 and/or server system 120 is depicted. Computer system 800 includes a processor subsystem 880 that is coupled to a system memory 820 and I/O interfaces(s) 840 via an interconnect 860 (e.g., a system bus). I/O interface(s) 840 is coupled to one or more I/O devices 850. Computer system 800 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 800 is shown in FIG. 8 for convenience, system 800 may also be implemented as two or more computer systems operating together.

Processor subsystem 880 may include one or more processors or processing units. In various embodiments of computer system 800, multiple instances of processor subsystem 880 may be coupled to interconnect 860. In various embodiments, processor subsystem 880 (or each processor unit within 880) may contain a cache or other form of on-board memory.

System memory 820 is usable store program instructions executable by processor subsystem 880 to cause system 800 perform various operations described herein. System memory 820 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 800 is not limited to primary storage such as memory 820. Rather, computer system 800 may also include other forms of storage such as cache memory in processor subsystem 880 and secondary storage on I/O Devices 850 (e.g., a hard drive, storage array, etc.). In some embodiments, these other forms of storage may also store program instructions executable by processor subsystem 880. In some embodiments, resources 125, system information 134, key 220, SUP algorithm 240, key generator 320, and system identifier generator 330 described above may be included/stored within system memory 820.

I/O interfaces 840 may be any of various types of interfaces configured to couple to and communicate with other devices, according to various embodiments. In one embodiment, I/O interface 840 is a bridge chip (e.g., Southbridge) from a front-side to one or more back-side buses. I/O interfaces 840 may be coupled to one or more I/O devices 850 via one or more corresponding buses or other interfaces. Examples of I/O devices 850 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 800 is coupled to a network via a network interface device 850 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A non-transitory computer-readable medium having program instructions stored thereon that are executable by a client computer system to perform operations comprising:
   sending authentication information to a server computer system for an initial access request for one or more resources available to the server computer system, wherein the authentication information includes authentication credentials and attributes that collectively identify the client computer system;
   receiving an authentication response from the server computer system that indicates an initial authentication of the client computer system to the server computer system, wherein the authentication response includes a cryptographic key;
   while the initial authentication is valid, the client computer system repeatedly re-authenticating to the server computer system for subsequent access requests, wherein each of the subsequent access requests includes a single-use password that is generated, for a given subsequent access request, using the cryptographic key and the attributes of the client computer system; and
   receiving, in the authentication response, a session identifier that corresponds to a session between the client computer system and the server computer system, wherein the initial authentication is valid for a duration of the session such that expiration of the session results in the initial authentication becoming invalid, wherein each of the subsequent access requests includes the session identifier and the single-use password generated for that subsequent access request.

2. The non-transitory computer-readable medium of claim 1, wherein the operations further comprise:
   subsequent to the session expiring, resending the authentication information to the server computer system to re-authenticate the client computer system.

3. The non-transitory computer-readable medium of claim 1, wherein the operations further comprise:
   generating the single-use password of a given subsequent access request by performing a single-use password derivation function using a seed that includes the cryptographic key and the attributes of the client computer system.

4. The non-transitory computer-readable medium of claim 1, wherein the operations further comprise:
   in response to the received authentication response including a device identifier, generating single-use passwords using the cryptographic key and the device identifier; and
   otherwise, generating single-use passwords using the cryptographic key and the attributes of the client computer system.

5. The non-transitory computer-readable medium of claim 1, wherein the operations further comprise:
   in response to sending an access request including a single-use password after the initial authentication has become invalid, receiving an authentication request to provide authentication credentials and attributes of the client computer system for re-authentication of the client computer system to the server computer system.

6. A non-transitory computer readable medium having program instructions stored thereon that are executable by a server computer system to perform operations comprising:
   receiving, from a client computer system, an initial access request for one or more resources available to the server computer system, wherein the initial access request includes authentication information identifying authentication credentials and attributes that collectively identify the client computer system;
   sending, to the client computer system, an authentication response indicative of an initial authentication of the client computer system, wherein the authentication response specifies a cryptographic key usable to generate single-use passwords;
   for each subsequent access request that is received from the client computer system while the initial authentication is valid:
   receiving a single-use password for re-authenticating the client computer system;
   generating a device identifier based on the attributes of the client computer system, wherein the device identifier is included in the authentication response and is usable to generate, for each subsequent access request, the received single-use password;
   re-authenticating the client computer system by determining whether the received single-use password is valid based on a first comparison between the received single-use password and another single-use password that is generated by the server computer system based on the cryptographic key and the attributes of the client computer system; and
   in response to determining that the single-use password is valid based on the first comparison, granting access to one or more resources requested in that subsequent access request.

7. The non-transitory computer readable medium of claim 6, wherein the operations further comprise:
   while the initial authentication is valid, receiving an access request from a different client computer system for one or more resources associated with a user of the client computer system, wherein the access request specifies a particular single-use password generated using the cryptographic key and attributes that collectively identify the different client computer system;
   determining whether the particular single-use password is valid based on a second comparison between the particular single-use password and another single-use password that is generated by the server computer system using the cryptographic key and the attributes that collectively identify the client computer system; and
   in response to determining that the particular single-use password is invalid based on the second comparison, rejecting the access request from the different client computer system.

8. The non-transitory computer readable medium of claim 6, wherein the initial authentication is valid for a predefined number of access requests.

9. The non-transitory computer readable medium of claim 6, wherein the operations further comprise:
in response to receiving an access request including a single-use password after the initial authentication has become invalid, sending an authentication request for authentication credentials and the attributes of the client computer system for re-authenticating the client computer system.

10. The non-transitory computer readable medium of claim 6, wherein the operations further comprise:
generating a session identifier that identifies a session between the client computer system and the server computer system; and
sending the session identifier in the authentication response, wherein expiration of the session results in the initial authentication becoming invalid.

11. The non-transitory computer readable medium of claim 10, wherein the operations further include:
receiving, for each subsequent access request from the client computer system, the session identifier in addition to a single-use password.

12. A method, comprising:
performing, by a server computer system, a portion of an initial authentication flow as part of an initial access request from a client computer system to gain access to resources available to the server computer system, wherein performing the portion of the initial authentication flow includes:
receiving, from the client computer system, authentication information specifying authentication credentials and device attributes, wherein the device attributes collectively identify the client computer system;
determining whether the authentication credentials are valid; and
subsequent to determining that the authentication credentials are valid, sending an authentication response that indicates an initial authentication of the client computer system and includes one or more resources and a cryptographic key that is usable to generate single-use passwords; and
for one or more subsequent access requests received from the client computer system while the initial authentication is valid, the server computer system determining a validity of the one or more subsequent access requests by:
generating, for a given one of the one or more subsequent access requests, a single-use password based on the device attributes of the client computer system and the cryptographic key, wherein the given subsequent access request specifies a client-side generated single-use password;
determining that the given subsequent access request is valid based on a comparison in which the single-use password matches the client-side generated single-use password;
performing, by the client computer system, a different portion of the initial authentication flow as part of the initial access request, wherein performing the different portion of the initial authentication flow includes:
sending, to the server computer system, the authentication information specifying the authentication credentials and the device attributes of the client computer system; and
receiving, from the server computer system, the authentication response including the cryptographic key that is usable to generate single-use passwords; and
when sending a subsequent access request to the server computer system while the initial authentication is valid:
generating a client-side single-use password for the subsequent access request using the cryptographic key and the device attributes of the client computer system; and
sending, to the server computer system, information that is indicative of the client-side generated single-use password that is usable to validate the subsequent access request.

13. The method of claim 12, wherein the authentication credentials include a username and a password of a user of the client computer system, wherein determining whether the authentication credentials are valid includes:
comparing a hashed version of the password included in the authentication credentials with a hashed version of a valid password stored in a database that is accessible to the server computer system; and
determining that the authentication credentials are valid based on the comparing indicating that the hashed version of the password matches the hashed version of the valid password.

14. The method of claim 12, wherein the device attributes include one or more of: a type of web browser running on the client computer system, a screen resolution displayed by the client computer system, a time zone in which the client computer system resides, and a model number of the client computer system.

15. The method of claim 12, wherein the initial access request is a login request issued via an application programming interface (API) provided by the server computer system.

16. The method of claim 12, wherein the resources that are available to the server computer system include one or more database records that are stored in association with a user of the client computer system.

* * * * *